US007757458B2

(12) United States Patent
Torre

(10) Patent No.: US 7,757,458 B2
(45) Date of Patent: Jul. 20, 2010

(54) PACKAGING MACHINE EQUIPPED WITH INDEPENDENT CUTTING AND WELDING BARS

(75) Inventor: Francesco Torre, Dalmine (IT)

(73) Assignee: Minipack-Torre S.p.A., Dalmine (BG) (IT)

( * ) Notice: Subject to any disclaimer, the term of this patent is extended or adjusted under 35 U.S.C. 154(b) by 162 days.

(21) Appl. No.: 12/162,602

(22) PCT Filed: Dec. 6, 2006

(86) PCT No.: PCT/IT2006/000838

§ 371 (c)(1), (2), (4) Date: Jul. 29, 2008

(87) PCT Pub. No.: WO2008/068784

PCT Pub. Date: Jun. 12, 2008

(65) Prior Publication Data

US 2009/0038265 A1 Feb. 12, 2009

(30) Foreign Application Priority Data

Feb. 8, 2006 (IT) .......................... TO2006A0088

(51) Int. Cl.
*B65B 51/10* (2006.01)

(52) U.S. Cl. ..................... 53/373.7; 53/374.6; 53/375.9

(58) Field of Classification Search ................ 53/373.7, 53/374.6, 374.8, 375.4, 375.6, 375.9
See application file for complete search history.

(56) References Cited

U.S. PATENT DOCUMENTS

| | | | | |
|---|---|---|---|---|
| 4,630,429 | A * | 12/1986 | Christine | 53/479 |
| 5,174,096 | A * | 12/1992 | Fukuda | 53/551 |
| 5,203,760 | A * | 4/1993 | Chen et al. | 493/302 |
| 5,787,681 | A * | 8/1998 | Papina et al. | 53/373.7 |
| 5,787,690 | A * | 8/1998 | Konno | 53/550 |
| 7,464,518 | B2 * | 12/2008 | Ansinn | 53/451 |

FOREIGN PATENT DOCUMENTS

| | | |
|---|---|---|
| WO | WO 92/09480 A1 | 6/1992 |
| WO | WO 02/00503 A1 | 1/2002 |

* cited by examiner

*Primary Examiner*—Sameh H. Tawfik
(74) *Attorney, Agent, or Firm*—David A. Farah; Sheldon Mak Rose & Anderson PC

(57) ABSTRACT

A machine (30) is described for packaging products in a plastic film, comprising at least one longitudinal cutting and welding bar (31) actuated in its up-and-down movement by at least one first piston (34), supported by a first supporting structure (37) of such packaging machine (30); at least one transverse cutting and welding bar (33) independent from the longitudinal cutting and welding bar (31) and actuated in its up-and-down movement by at least one second piston (35) supported by a second supporting structure (39) of such packaging machine (30); and controlling and managing means adapted to control and program the operation of at least the first and the second piston (34, 35).

14 Claims, 4 Drawing Sheets

PACKAGING MACHINE EQUIPPED WITH INDEPENDENT CUTTING AND WELDING BARS

CROSS-REFERENCE TO RELATED APPLICATIONS

The present Application is a national stage of International Patent Application No. PCT/IT2006/000838, titled "Packaging Machine Equipped With Independent Cutting and Welding Bars," filed Dec. 6, 2006, which claims priority from Italian Patent Application No. TO2006A000088 filed Feb. 8, 2006, the contents of which are incorporated in this disclosure by reference in their entirety.

FIELD OF THE INVENTION

The present invention refers to a packaging machine of products in a plastic film equipped with independent cutting and welding bars.

BACKGROUND OF THE INVENTION

The prior art proposed packaging machines of products inside a plastic film equipped with a "L"-shaped welding frame with two bars for welding and cutting the film, that are respectively transverse and longitudinal with respect to the plastic film supplying direction and are mutually integral, like the one shown in enclosed FIG. 1 and described below. Such machines have the problem that, in order to guarantee the perfect contact between the welding and cutting bars and their abutments, this allowing the complete cutting and welding of the plastic film, particularly accurate assemblings and setting ups are necessary.

Other automatic packaging machines existing on the market are called continuous head welding machines. They are different from the other machines with cutting and welding bars with frame linked as an "L" since they are equipped with a welding and cutting head arranged on the longitudinal side with respect to film sliding. This head is usually composed of hot rollers that cut and weld the plastic film, or of small hot blades, also placed as a pair of scissors. These systems are very complicate and costly for their setting up, and do not provide any guarantee of continuity and good operation during long operating cycles. This is partly due to the residual dirt of the plastic film that carbonizes on the hot welding blades.

SUMMARY OF THE INVENTION

Therefore, object of the present invention is solving the above prior art problems by providing a packaging machine equipped with independent cutting and welding bars that guarantee a perfect contact with their lower abutments without requiring the accuracy level of prior art assemblings and setting-up.

Moreover, an object of the present invention is providing a packaging machine equipped with independent cutting and welding bars that allows removing prior art frames and mechanisms for handling the welding bars.

A further object of the present invention is providing a packaging machine equipped with independent cutting and welding bars that allows cutting the film with unlimited length.

Another object of the present invention is providing a packaging machine equipped with independent cutting and welding bars that allows easily adjusting the cutting and welding pressure and/or the welding bar lifts.

Another object of the present invention is also providing a packaging machine equipped with independent cutting and welding bars that allows an extreme quickness of up-down movement of the welding bars.

The above and other objects and advantages of the invention, as will appear from the following description, are obtained with a packaging machine equipped with independent welding and cutting bars as described in claim 1. Preferred embodiments and non-trivial variations of the present invention are the subject matter of the dependent claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF THE INVENTION

Figure 1:
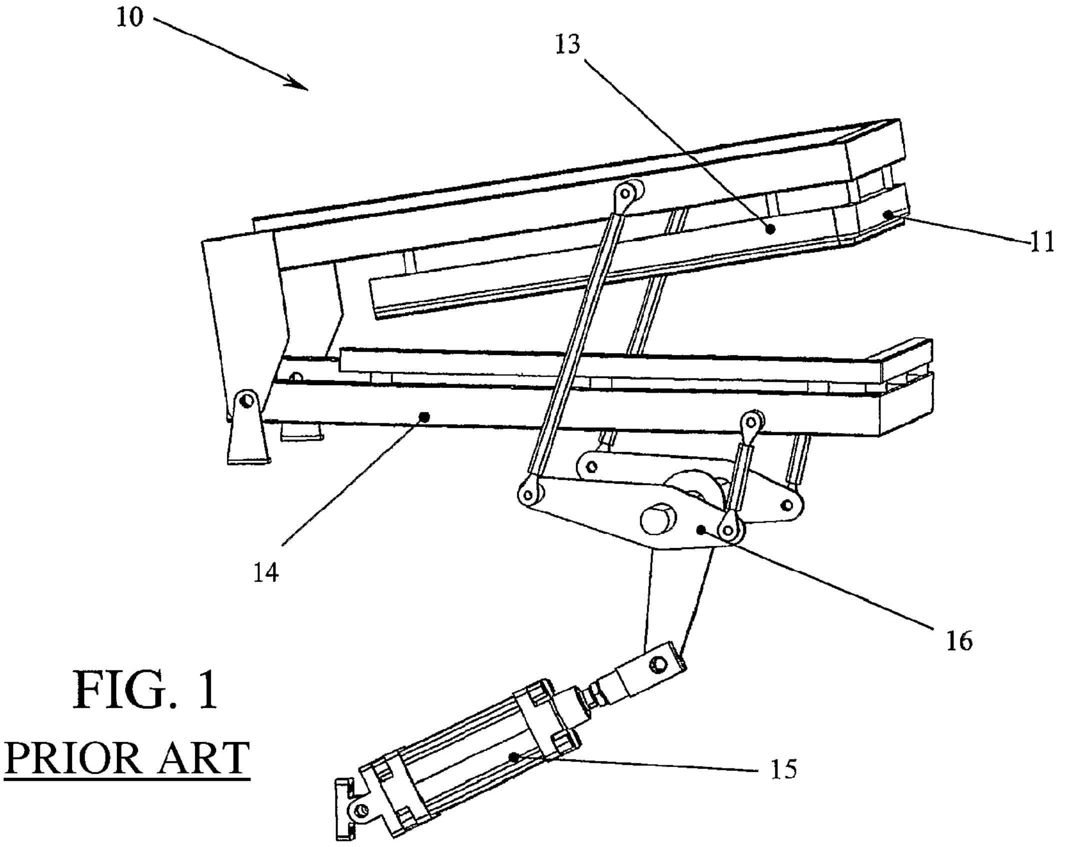
FIG. 1 shows a perspective view of a welding frame for plastic film according to the prior art.

With reference to FIG. 1, it is possible to note a welding and cutting frame 10 of a known packaging machine: such frame is shaped substantially as a "L" with a transverse welding and cutting bar 11 linked to a longitudinal welding and cutting bar 13 integrally with the frame 10 hinged to a lower abutment frame 14. The transverse cutting and welding bar 11 is normally actuated by known mechanical movements and systems 16. In some cases the mechanical up-down movement of welding bars against the lower abutment frame 14 is actuated by an electric motor or a pneumatic piston 15.

Figure 2:
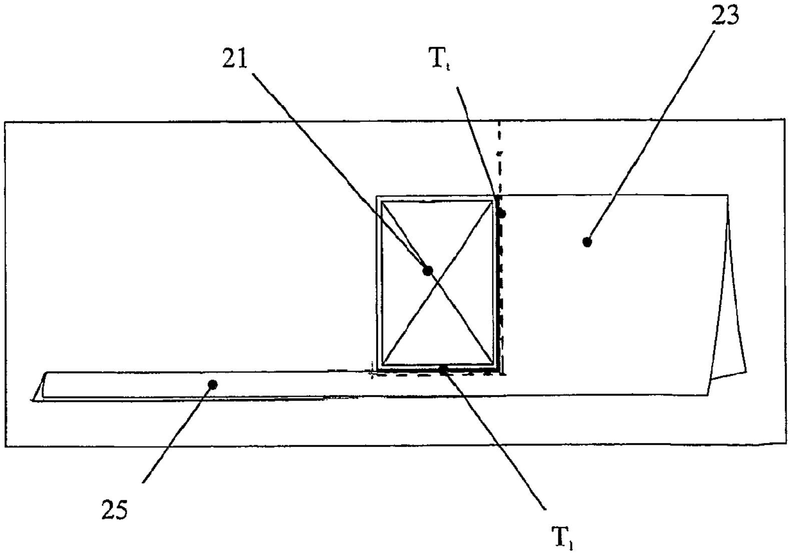
FIG. 2 shows a schematic top view of a cutting and welding mode of a plastic film of the welding frame of FIG. 1.

As can be noted in FIG. 2, when packaging miscellaneous products, the same product 21 is inserted in a single-bent plastic film 23 that, by advancing by means of conveyor belts, stops in the welding and cutting area. The welding bars 11, 13 (or the "L"-shaped welding and cutting frame 10 of the film) automatically descends, welding and cutting the film around the product 21 on the two sides according to the transverse $T_t$ and longitudinal $T_1$ cutting lines.

After having ended this operation, the welding and cutting frame 10 is lifted, and the product 21, by means of the conveyor belt, advances to be evacuated from the machine. During this product 21 evacuation movement, another product inserted in the plastic film, by means of the supplying conveyor belt, is arranged in the welding and cutting area, making the machine continuously operating. The longitudinal waste of the plastic film as scrap band 25 is typically wound on a winder arranged in a suitable housing of the machine framework. A known machine like the previously described one has the problems that the present invention aims to solve.

The advantages of the packaging machine 30 according to the present invention are in fact a system that is mainly based on its independence from its two longitudinal 31 and transverse 33 cutting and welding bars with respect to the plastic film supplying direction. In fact, they are advantageously actuated for their vertical up-and-down movement, adapted to perform welding and cutting of the plastic film around a product to be packaged, by pistons 34, 35, that are preferably pneumatic, suitably programmed and actuated by substantially known controlling and managing means, such as an electronic unit.

Figure 3:
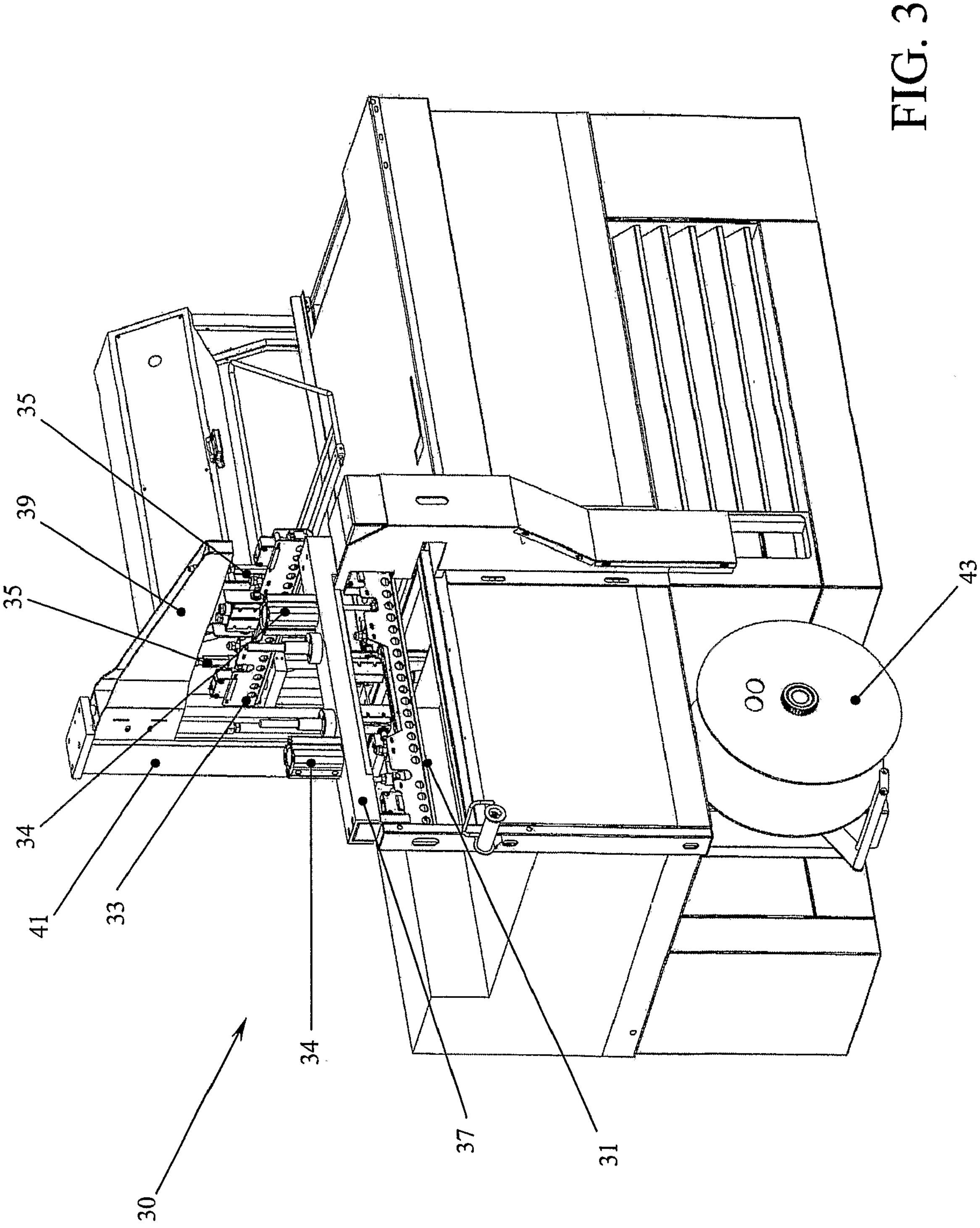
FIG. 3 shows a side perspective view of a preferred embodiment of the packaging machine equipped with independent welding and cutting bars according to the present invention.
Figure 3B:
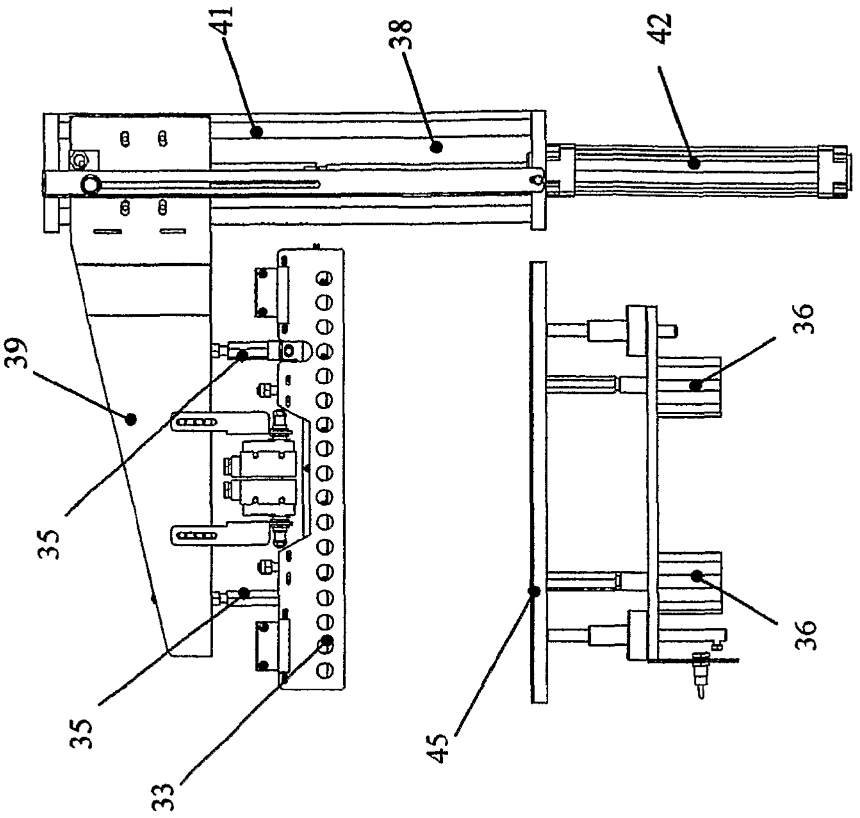
FIG. 3*b* shows a front view of an embodiment of a transverse welding and cutting bar of the machine of FIG. 3.
Figure 3A:
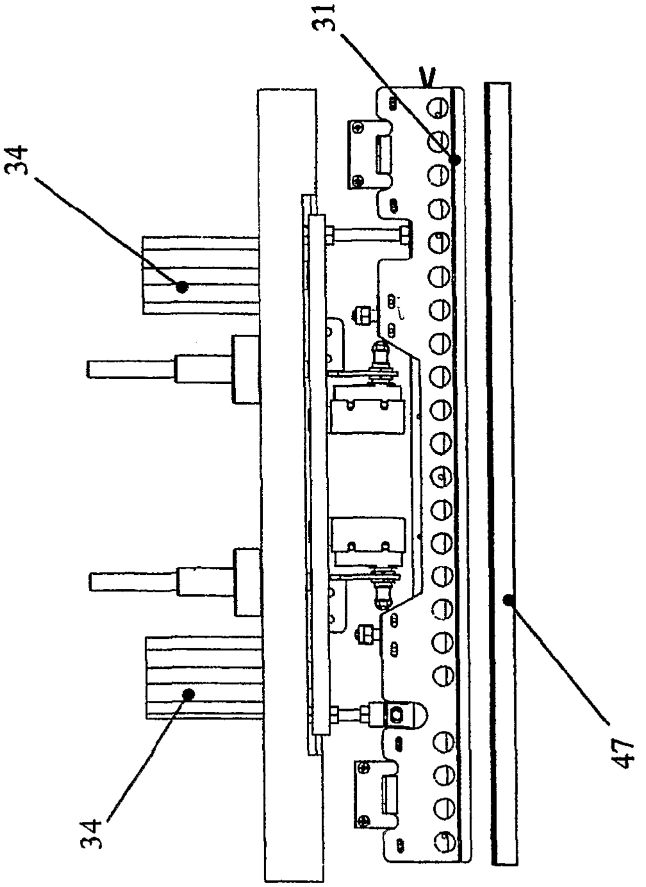
FIG. 3*a* shows a side view of an embodiment of a longitudinal welding and cutting bar of the machine of FIG. 3.

With reference then to FIG. 3, it is possible to note that an embodiment of the packaging machine 30 according to the present invention comprises:

at least one longitudinal cutting and welding bar 31 actuated in its up-and-down movement by at least one first piston 34, preferably with pneumatic operation, supported by a first supporting structure 37 of the packaging machine 30; as shown in the Figures, the packaging machine 30 is preferably equipped with two first pistons 34;

at least one transverse cutting and welding bar 33, such transverse cutting and welding bar 33 being independent from the longitudinal cutting and welding bar 31 and actuated in its up-and-down movement by at least one second piston 35, preferably with pneumatic operation, supported by a second supporting structure 39 of the packaging machine 30; as shown in the Figures, the packaging machine 30 is preferably equipped with two second pistons 35.

Obviously, at least the first and second pistons 34, 35 are driven and programmed in their operation by the controlling and managing means.

In a preferred variation of the packaging machine 30 according to the present invention, the second supporting structure 39 is actuated in its up-and-down movement by suitable sliding guides 38 and by at least one piston 42, preferably of the pneumatic type, or by another adequate mechanical mechanism, arranged in a carrier column 41, such second supporting structure 39 being able to be handled and/or adjusted in its height depending on the sizes of the products to be packaged.

This system guarantees very quick movements, in addition to guaranteeing a prefixed pressure of the bars 31, 33 in the plastic film cutting and welding operation.

In a possible operating variation of the packaging machine 30 according to the present invention, the independence of the two film cutting and welding bars provides the possibility, through a suitable programming of movements of pistons 34, 35 by operating on the controlling and managing means, to keep the transverse cutting and welding bar 33 unmoving and, by actuating only the longitudinal cutting and welding bar 31, it is possible to longitudinally operate on an unlimited film cutting and welding length. Moreover, the up-and-down movement excursion of the longitudinal cutting and welding bar 31 can be limited since it must allow, during its lift, only the passage of the dragging film thickness that then, after the longitudinal cutting, will be wrapped on a substantially known winder 43 for containing the waste film. These reduced movements allow the packaging machine 30 according to the present invention to reach very high packaging speeds, with respect to other systems that use the welding bars on "L"-shaped frames according to the prior art like those previously described.

Obviously, as already occurs in the prior art, the abutment bars of the cutting and welding bars 31, 33 can be fixed. Alternatively, in a further variation of the packaging machine 30 according to the present invention, a first lower abutment bar 45 of the transverse cutting and welding bar 33 can also be actuated, for example due to technical needs for passing the product, in an up-and-down movement coordinated with the movement of the transverse cutting and welding bar 33 itself, by at least one third piston 36, preferably of the pneumatic type, that guarantees a rather relevant counterpressure to the welding bar 33. Moreover, such third piston 36 allows guaranteeing the perfect contact, with a self-aligning effect, of the welding bar 33 to the first lower abutment bar 45 during its height adjustment. As shown in the Figures, the packaging machine 30 is preferably equipped with two third pistons 36.

Obviously, in a further variation, also a second lower abutment bar 47 of the longitudinal cutting and welding bar 31 could be actuated in an up-and-down movement coordinated with the movement of the longitudinal cutting and welding bar 31 itself, by at least one fourth piston (not shown), preferably of the pneumatic type. Similarly to what has been stated above, the packaging machine 30 is preferably equipped with two fourth pistons.

Figure 4A:
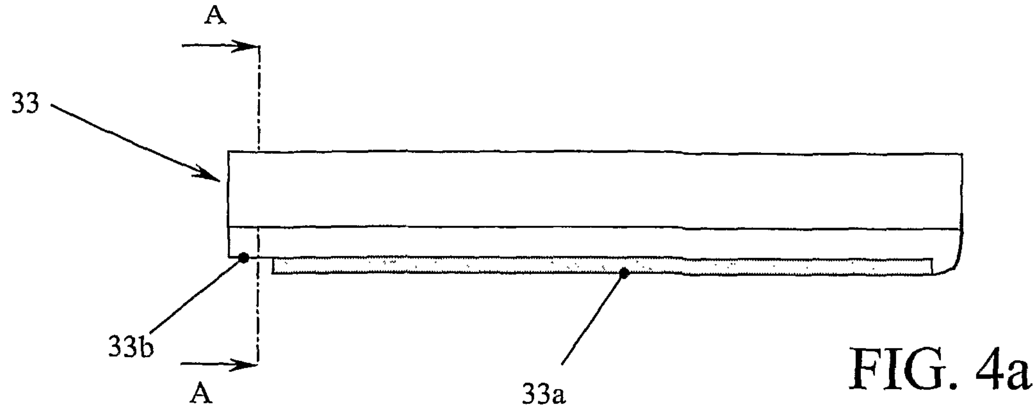
FIGS. 4*a* and 4*b* respectively show an enlarged side view and an enlarged sectional view of an embodiment of a longitudinal welding and cutting bar of the machine according to the present invention.
Figure 4B:
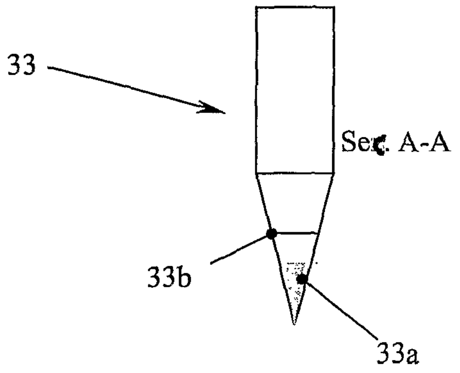
Figure 5:
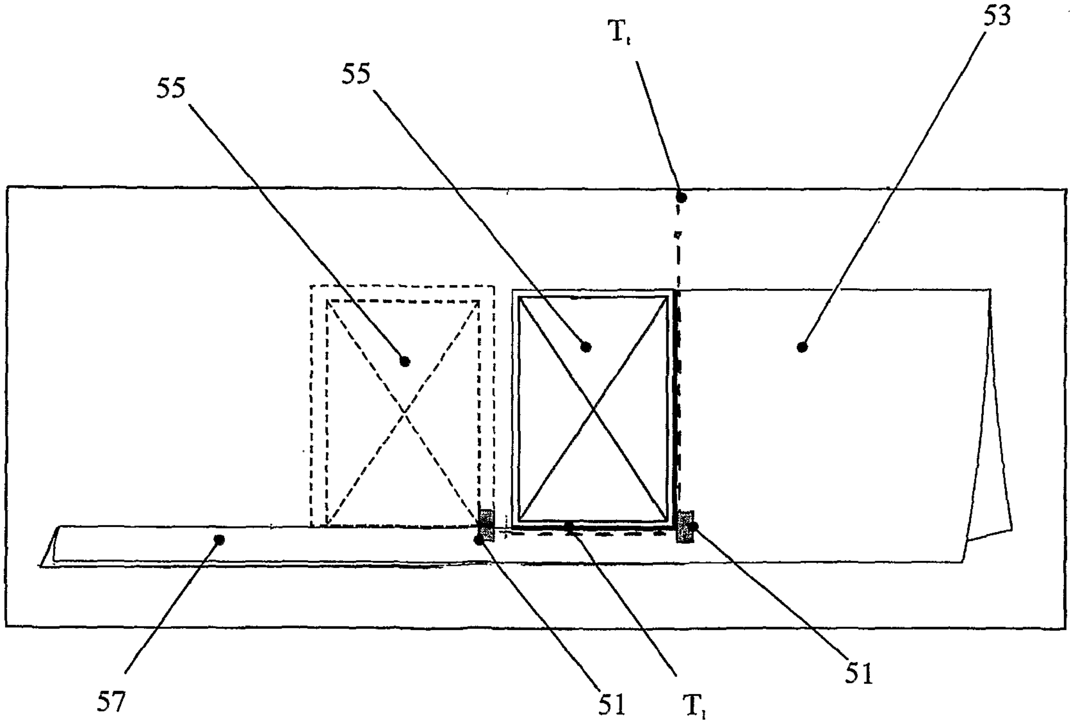
FIG. 5 shows a schematic top view of a cutting and welding mode of a plastic film through a longitudinal welding and cutting bar of FIGS. 4*a* and 4*b*.

With reference now to FIGS. 4*a* and 4*b*, it is possible to note a particular embodiment of the transverse cutting and welding bar 33 of the packaging machine 30 according to the present invention. In fact it comprises a first cutting and welding portion 33*a* typically having a substantially "V"-shaped section, and a second welding portion 33*b* adapted to realise a small welded plate 51, not cut, on the plastic film 53, next to the angle between the transverse cut $T_t$ and the longitudinal cut $T_1$ around the product 55 to be packaged of the film 53 performed by the descent of bars 31, 33. With reference in particular to FIG. 5, it is possible to note that, once the same product 55 is inserted in the single-bent plastic film 53, this latter one, advancing by means of known conveyor belts, stops in the welding and cutting area. The cutting and welding bars 31, 33 and the longitudinal bar 31 automatically descend, performing a longitudinal cut $T_1$ together with the transverse bar 33 performing a transverse cut $T_t$ and realising the small welded-plate 51 on the band of plastic film 53 around the product 55.

After having ended this operation, the cutting and welding bars 31, 33 are lifted, and the product 55, by means of the conveyor belt, is taken to a more advanced position shown in the Figure with dashed lines. During this movement of the product 55, another product inserted in the plastic film 53, by means of the supplying conveyor belt, is arranged in the welding and cutting area for its packaging. The descent of the longitudinal bar 31 then, in addition to performing again the longitudinal cut around the new product, cuts the small welded plate 51 and finally separates the packaged product 55 from the waste film band 57. The small welded plate is therefore adapted, in addition to correcting possible cutting alignment defects on the angle between the two bars 31, 33, to prevent, when dragging the waste band of the film 55, the still hot, and therefore particularly delicate, welding next to the angle between the transverse cut $T_t$ and the longitudinal cut $T_1$ from being broken, jeopardising the product packaging.

The invention claimed is:

1. A packaging machine for packaging products in a plastic film, the packaging machine comprising:

at least one longitudinal cutting and welding bar actuated in an up-and-down movement by at least one first piston, supported by a first supporting structure of the packaging machine;

at least one transverse cutting and welding bar, the transverse cutting and welding bar being independent from the longitudinal cutting and welding bar and actuated in an up-and-down movement by at least one second piston supported by a second supporting structure of the packaging machine; and controlling and managing means adapted to control and program an operation of at least the first piston and the second piston;

where the controlling and managing means are adapted to keep the transverse cutting and welding bar unmoving and to actuate only the longitudinal cutting and welding bar; and where the transverse cutting and welding bar comprises a first cutting and welding portion having a "V"-shaped section and a second welding portion adapted to realize a small welded plate, the small welded plate not having cuts, on the plastic film next to an angle on the film between a transverse cut $T_t$ and a longitudinal cut $T_1$ performed by the cutting and welding bars around a product to be packaged.

2. The packaging machine according to claim 1, where the second supporting structure is actuated in an up-and-down movement by sliding guides and by at least one pneumatic piston arranged in a carrier riser, along which the second supporting structure is moved, adjusted, or moved and adjusted in height.

3. The packaging machine according to claim 1, further comprising a first lower abutment bar of the transverse cutting and welding bar, the first lower abutment bar being actuated in an up-and-down movement coordinated with the movement of the transverse cutting and welding bar by at least one third piston.

4. The packaging machine according to claim 3, where the third piston is pneumatically operated.

5. The packaging machine according to claim 3, further comprising two third pistons.

6. The packaging machine according to claim 3, where the controlling and managing means are adapted to control and program an operation of the third piston.

7. The packaging machine according to claim 1, further comprising a second lower abutment bar of the longitudinal cutting and welding bar, the second lower abutment bar being actuated in an up-and-down movement coordinated with the movement of the longitudinal cutting and welding bar by at least one fourth piston.

8. The packaging machine according to claim 7, where the fourth piston is pneumatically operated.

9. The packaging machine according to claim 7, further comprising two fourth pistons.

10. The packaging machine according to claim 7, where the controlling and managing means are adapted to control and program an operation of the fourth piston.

11. The packaging machine according to claim 1, where the first piston is pneumatically operated.

12. The packaging machine according to claim 1, where the second piston is pneumatically operated.

13. The packaging machine according to claim 1, further comprising two first pistons.

14. The packaging machine according to claim 1, further comprising two second pistons.

* * * * *